United States Patent Office 3,119,826
Patented Jan. 28, 1964

3,119,826
PIPERAZINE DERIVATIVES
Gilbert Regnier, Sceaux, Maurice Graizon, Paris, and Jean-Claude Le Douarec, Versailles, France, assignors to Société en nom collectif dite: "Science Union et Compagnie-Societe Francaise de Recherche Medicale," Suresnes, Seine, France, a French society
No Drawing. Filed Apr. 9, 1962, Ser. No. 185,855
Claims priority, application France Apr. 12, 1961
28 Claims. (Cl. 260—268)

This invention relates to novel piperazine derivatives, possessing advantageous therapeutic and other characteristics, and to methods of preparing the novel compounds.

The piperazine derivatives of the invention answer the general formula:

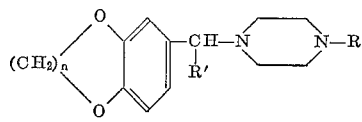

wherein:
(a) $n$ may assume either of the values of 1 and 2;
(b) R may represent any one of the following—
An unsubstituted benzoyl radical;
A benzoyl radical substituted with one, two or three hydroxyl, carbethoxy, oxy, nitro, primary amine, lower alkoxy (up to $C_4$), or alkylene-dioxy (up to $C_3$) groups;
An unsubstituted benzyl radical, or such a radical substituted with one, two or three of the groups just specified;
An unsubstituted benzhydryl radical, or a benzhydryl radical in which one of the phenyl groups is substituted with a halogen atom, a lower alkoxy group (up to $C_4$), or a methylene-dioxy group;
An unsubstituted phenacyl radical, or a phenacyl radical wherein the phenyl groups is substituted with a halogen atom, a lower alkoxy group (up to $C_4$), or a methylene-dioxy group;
A primary or secondary alkanol chain containing from 2 to 9 carbon atoms, a primary and secondary alkane dioxy chain and hydroxyalkoxyalkane, alkylthioalkane, alkysulfonylalkane chains containing from 2 to 8 carbon atoms;
An alkane chain having from 0 to 7 carbon atoms or an alkyl or an alkylsulfonylalkane,
(c) R' represents hydrogen or an alkyl radical up to $C_4$.

The compounds of the invention are prepared by a process comprising the preparation of a 3,4-alkylene-dioxy benzyl piperazine, unsubstituted or substituted, by condensation of the corresponding 3,4-alkylene-dioxy benzyl piperazine with a piperazine, unsubstituted or having N monosubstitutions. Disubstituted derivatives of the same family may also be obtained by condensation of the 3,4-alkylene-dioxy benzyl piperazine prepared as above with a halo-derivative of the corresponding R radical, RX (wherein R has the meaning specified above).

The process of preparation just described is preferably conducted in the liquid phase, with the solvent at the boil. Depending on the character of the R substitutions, the solvent used may be polar (alkanols, ketones), or non-polar (aromatic hydrocarbons). It is desirable to operate in the presence of an agent of slightly alkaline character such as an alkaline carbonate or tertiary amine (e.g. triethylamine, dimethylaniline or pyridine).

The resulting compounds are purified by any of the conventional techniques, including distillation, crystallization, chromatography, or chemically, as by forming the addition salts previously specified, crystallizing the salts and decomposition in an alkaline medium.

Preferably, the compounds are utilized in the form of their addition products with inorganic compounds such as hydrochloric acid, hydrobromic acid, methane-sulfonic acid, sulfuric acid, phosphoric acid; or organic compounds such as acetic acid, propionic acid, maleic acid, fumaric acid, tartric acid, citric acid, oxalic acid, benzoic acid.

The addition reactions may be performed in any suitable solvent such as water, alcohols or ketones.

The following examples will serve to illustrate typical practical procedures for the preparation of some of the novel compounds. Melting points are all determined by the Kofler test.

EXAMPLE 1

(1) Piperonyl Piperazine

To a boiling solution containing 0.2 mole of a 1-to-1 mixture of piperazine hexahydrate and piperazine dichlorohydrate in 100 ml. methanol, with in a pH range of from 2 to 5, 0.2 mole piperonyl chloride are added dropwise. The mixture is heated under reflux for 90 minutes, then the ethanol is evaporated under reduced pressure, the mixture is taken up in water, strongly alkalized with soda lye and extracted with chloroform. After drying and solvent evaporation, the mixture is rectified under a high vacuum. There are obtained 15 g. piperonyl piperazine. B.P. 147–149° C. under 2 mm. Hg. The dihydrochloride melts at 232–236° (from ethanol).

The piperonyl chloride used in this example was prepared by chlorination of 3,4-methylene-dioxy benzyl alcohol (obtained by reduction of piperonal) with $Cl_2SO$ in benzene.

1-Piperonyl 4-(3', 4', 5'-Trimethoxy Benzoyl) Piperazine

To a solution containing 0.1 mole piperonyl piperazine and 0.1 mole triethylamine in 250 ml. anhydrous benzene, at the boil, 0.1 mole trimethoxy benzoyl chloride is added. The mixture is heated 3 hours at reflux, cooled, 100 ml. water are added and the aqueous fraction is separated by sedimentation. The organic layer is extracted with several batches of 10% methane-sulfonic acid. The acid extracts are combined and washed with ether then alkalized with sodium carbonate. The mixture is extracted with several batches of chloroform and the combined chloroform solutions are washed several times with water. After drying and solvent evaporation, the crude resinous base is isolated and the hydrochloride thereof is formed in acetone. After recrystallization from aqueous ethanol, there are obtained 9.6 g. of N-piperonyl N'-(3,4,5-trimethoxy benzoyl) piperazine hydrochloride. M.P.=221° C. (with decomposition). Yield=57%.

Using a similar procedure as in Example 2, the following compounds have been prepared:

(a) 1 - piperonyl 4 - (3',4' - methylene-dioxy benzoyl) piperazine.—The hydrochloride melts at 210° C., the methane sulfonate melts at 227° C. Yield 62%, from methylene 3,4-methylene-dioxy benzoyl chloride.

(b) 1-piperonyl 4-(2'-hydroxy benzoyl) piperazine.—The hydrochloride melts at 221° C., yield 33%, from salicyloyl chloride.

(c) 1-piperonyl 4-(3',5'-dimethoxy 4'-carbethoxyoxy benzoyl) piperazine.—The methane sulfonate melts at 218–219° C.; yield 64%, from 3,5-dimethoxy 4-carbethoxyoxy benzoyl chloride.

(d) 1-piperonyl 4-(4'-carbethoxyoxy benzoyl) piperazine.—The hydrochloride melts at 240° C. with decomposition. Yield: 87%, from 4-carbethoxyoxy benzoyl chloride (e) 1-piperonyl 4-(2'-hydroxy 5'-carbethoxyoxy benzoyl) piperazine.—The hydrochloride melts at 220° C.

with decomposition. Yield: 31%, from 2-hydroxy 5-carbethoxyoxy benzoyl chloride.

(f) *1-piperonyl 4-(4'-nitro benzoyl) piperazine.*—The base melts at 172° C. Yield: 74%.

(g) *1-(3',4'-methylene-dioxy benzoyl) 4-(3″,4″-methylene-dioxy benzyl) piperazine.*—To a solution containing 60 g. (3,4-ethylene-dioxy benzyl) piperazine (B.P./0.8 mm.=165° C.) in 1500 ml. anhydrous toluene there are added 56.5 g. (3,4-dioxy methylene) benzoyl chloride and 25.85 g. triethylamine. The mixture is stirred and maintained at the boil for 9 hours. The mixture is then cooled and the triethylamine hydrochloride formed is filtered off, the filtrate is washed with water and extracted with three 200 ml. batches of 10% methane-sulfonic acid. The acid solutions are combined and washed with two further 100 ml. batches of ether. After decantation, the acid solution is alkalized with sodium carbonate, then extracted several times with chloroform. After washing the combined chloroformic solutions with water, they are dried over potassium chloride and the solvent is evaporated under reduced pressure. There are obtained 96 g. of crude resin. This is dissolved in 400 ml. ethanol at the boil and crystallized by cooling, finally yielding 82.5 g. 1-(3',4'-methylene-dioxy benzoyl) 4-(3″,4″-ethylene-dioxy benzyl) piperazine, M.P. 130° C.

By adding hydrochloric ether to a solution of this base in ethanol, there are obtained 88 g. dihydrochloride melting at 242° C. (instantaneous, with decomposition).

The initial 1-(3',4'-ethylene-dioxy benzyl) piperazine was prepared as follows:

To a solution containing 100 g. formyl piperazine in 2000 ml. anhydrous toluene there were added 121.7 g. dry potassium carbonate and 162.8 g. 3,4-ethylene-dioxy benzyl chloride, and the mixture heated at reflux for 20 hrs.

After cooling the salt was filtered, the toluenic solution extracted with methane sulfonic acid and the treatment was continued as in the above example. After solvent evaporation there are obtained 138 g. of crude 1-(3',4'-ethylene-dioxy benzyl) 4-formyl piperazine, a thick oil which is dissolved in 1,100 ml. ethanol. To the resulting solution there are added 1,640 ml. of a 20% soda solution and the mixture is heated 15 hours at boiling point. The alcohol is then evaporated in vacuo and the insoluble oil is extracted several times with chloroform. The combined chloroformic solutions are washed with water and dried over $K_2CO_3$. After solvent evaporation under reduced pressure and distillation of the oily residue in a high vacuum, there are obtained 70 g. 1-(3',4'-ethylene-dioxy benzyl) piperazine, B.P. 165° C. at 0.8 mm. Hg.

The crude (3,4-ethylene-dioxy) benzyl chloride used in this reaction was obtained by chlorination with $Cl_2SO$ in anhydrous ether, of (3,4-ethylene-dioxy) benzyl alcohol (B.P./1.5 139–141° C., $n_D^{25}$=1.5672) obtained in turn by reduction of (3,4-ethylene-dioxy) benzaldehyde with $LiAlH_4$ in anhydrous ether.

(h) As in Example 2, but using (3,4-ethylene-dioxy) benzoyl chloride, 1-(3',4'-ethylene-dioxy benzoyl) 4-(3″,4″-ethylene-dioxy benzyl) piperazine is obtained with a 74.5% yield, M.P. 160° C. The hydrochloride melts at 237–240° C. with decomposition.

The initial (3,4-ethylene-dioxyl benzoyl chloride) benzoyl, M.P. 102° C. was prepared by chlorination, with $Cl_2SO$, in benzene, of 3,4-dioxy ethylene benzoic acid, M.P. 138° C., itself prepared by oxidizing the corresponding aldehyde with $KMnO_4$.

(i) Proceeding as in Example 2, but using methylene dioxybenzoyl chloride and 1-(α-methyl 3',4'-methylene-dioxy benzyl) piperazine, the hydrochloride of 1-(3',4'-methylene-dioxy, α-methyl benzyl) 4-(3″,4″-methylene dioxy benzoyl) piperazine is obtained with a yield of 41%. This compound melts at 206° C. with decomposition.

The initial 1-(3″,4″-dioxy α-methyl benzyl) piperazine, B.P./0.5 mm.=185° C., was prepared by a method similar to that described in connection with 1-(3',4'-ethylene-dioxy benzyl) piperazine in paragraph (g) of Example 2, from non-distillable 1-chloro 1-piperonyl ethane, itself prepared by chlorination of piperonyl methyl carbinol, B.P./0.1=113° C., with $Cl_2SO$ in benzene.

EXAMPLE 3

*1-Piperonyl 4-(3',5'-Dimethoxy 4'-Hydroxy Benzoyl) Piperazine*

To a solution containing 10 g. of the carbethoxyl derivative described in paragraph (c) of Example 2 in 200 ml. ethanol, there are added 53 ml. concentrated ammonia solution and the mixture is allowed to stand 12 hours at 25° C.

The solvent is then evaporated under reduced pressure and the residue is taken up with chloroform. After washing with water and drying the chloroformic solution, it is evaporated under reduced pressure. The resulting crude base is dissolved in acetone and hydrochloric ether is added. The resulting hydrochloride is recrystallized from aqueous methanol. The yield is 6.3 g. M.P. 252–253° C.

By a similar procedure 1-piperonyl 4-(4'-hydroxy benzoyl) piperazine was prepared. This base melts at 188° C., yield 55% from the compound specified in Example 2, paragraph (d) above.

EXAMPLE 4

*1-Piperonyl 4-(4'-Amino Benzoyl) Piperazine*

To a solution containing 23 g. of the nitrogen derivative described in Example 2, paragraph (f), in 23 ml. 80% acetic acid, 10 g. powder iron are added in small batches over 15 minutes at 100° C. A brisk effervescence occurs while the solution turns a dark brown. After the addition of iron has been completed the mixture is heated a further 15 minutes at reflux, then cooled, the excess iron is filtered off and the solvent is evaporated under reduced pressure. The resulting residue is taken up with 300 ml. water and strongly alkalized with potassium carbonate. The mixture is stirred with chloroform and the resulting ferric salt precipitate is filtered off. The precipitate is washed over the filter several times with chloroform, then the filtrate is separated by sedimentation and the chloroform layer is dried over potassium carbonate. After filtering and solvent evaporation the residue is mixed in ether. The crude base crystallizes. After recrystallization from aqueous methanol, there are obtained 14 g. of the product which melts at 115° C. and then 149° C. (from aqueous methanol).

EXAMPLE 5

*1,4-Bipiperonyl Piperazine*

To a solution containing 22 g. piperonyl piperazine in 100 ml. xylene, 17 g. of piperonyl chloride are added dropwise then the mixture is heated at reflux for 7 hours. The hydrochloride precipitates slowly during the heating. After the reaction is completed, the resulting salt is filtered out and dissolved in boiling water. An excess of concentrated hydrochloric acid is added. The dihydrochloride crystallizes out. There is finally obtained 13 g. of the salt, melting at about 260° C. with decomposition.

EXAMPLE 6

*1-Piperonyl 4-Benzhydryl Piperazine*

To a solution of 32 g. piperonyl piperazine in 100 ml. anhydrous toluene, 10 g. $Na_2CO_3$ are added and 35.2 g. benzhydryl chloride are added dropwise. The mixture is then heated to reflux for 7 hours with vigorous agitation. Then the mixture is cooled, the salt that has formed is filtered out and the toluene solution is treated as in Example 2.

22.5 g. of the dihydrochloride are finally obtained, melting at 228° C., from methanol.

Using the same procedure as in this example, the following compounds were further prepared:

(a) 1-piperonyl 4-(4' chlorobenzhydryl) piperazine.—The dihydrochloride melts at 212° C. with decomposition. Yield is 28.5%, from 4-chlorobenzhydryl chloride.

(b) 1-piperonyl 4-(3'4'-methylene-dioxy benzhydryl) piperazine.—The dihydrochloride melts at 208° C. with decomposition. The yield is 13% from 3,4-methylene-dioxy benzhydryl chloride.

EXAMPLE 7

*1-Piperonyl 4-Phenacyl Piperazine*

A solution of 0.1 mole piperonylpiperazine in 250 ml. anhydrous xylene is treated with 0.1 mole phenacyl chloride dropwise, at the boil. The mixture is maintained at boiling point 2 hours with vigorous agitation. The dihydrochloride precipitates gradually. The cooled solution is drained and recrystallized from ethanol. 23.1 g. dihydrochloride are obtained. M.P. 225° C., yield 50%.

EXAMPLE 8

*1-Piperonyl 4-(4'-Fluorophenacyl) Piperazine*

To a solution of 0.1 mole piperonyl piperazine in 250 ml. anhydrous toluene 0.102 mole triethylamine is added and the mixture is heated at reflux. 0.102 mole 4'-fluoro 2-bromo-acetophenone is then added and the reflux heating is continued another 3½ hours. The mixture is then cooled and treated with 100 ml. water. After separation of the aqueous layer, the organic layer is extracted several times with 3% hydrochloric acid, then the acid liquor is washed with ether. The mixture is then alkalized with soda lye and extracted with chloroform. The extract is washed and dried, then evaporated under reduced pressure, and yields the crude base in crystallized form. After recrystallization from cyclohexane, there is obtained 2.6 g. of the product, M.P. 100° C.

EXAMPLE 9

*1-Piperonyl 4-(3',4'-Methylene-Dioxy Phenacyl) Piperazine*

Proceeding as in Example 8 but using (3',4' methylene-dioxy) 2-bromoacetophenone, 6 g. are obtained of a crude resinous base in the form of the dihydrochloride in acetone. After recrystallization from ethanol, 3.26 g. dihydrochloride are obtained. M.P. 235–239° C. with decomposition. The corresponding base melts at 115° C.

EXAMPLE 10

*1-Piperonyl 4-(2',3'-Dihydroxy Propyl) Piperazine*

To a solution of 0.2 mole (2,3-dihydroxy propyl) piperazine in 250 ml. anhydrous toluene, 0.22 mole $Na_2CO_3$ are added, then heated to boiling point. 0.2 mole piperonyl chloride is then added and the mixture is further heated for 7 hours. It is then cooled, taken up with 100 ml. water and further treated as in Example 2. There is finally obtained 13 g. dihydrochloride, M.P. 204° C., yield 39%.

EXAMPLE 11

*1-Piperonyl 4-Hydroxyethyoxyethyl Piperazine*

Proceeding as in Example 6, starting with 25 g. piperonyl piperazine, 12 g. $Na_2CO_3$ and 14.2 g. hydroxyethoxyethyl chloride in toluene, heated at reflux for 7 hours, and subsequent treatment as in Example 2, there are obtained 11 g. of the dihydrochloride, M.P. 197° C. with decomposition.

EXAMPLE 12

*1-Piperonyl 4-(Methylthioethyl) Piperazine*

To a solution of 0.1 mole piperonylpiperazine and 0.1 mole triethylamine in 100 ml. xylene, 0.15 mole 2-methylthio-1-chloroethane is added at the boil and heating is continued 24 hours. The mixture is then cooled and treated with 50 ml. water. The aqueous layer is separated and the organic fraction extracted several times with 10% methane sulfonic acid. The acid liquor batches are combined, washed with ether and alkalized with dilute NaOH. The product is extracted with chloroform, the resulting chloroform liquor is washed with water, dried and the solvent evaporated in vacuo. The oily residue is distilled in vacuo. B.P./1.5=101–199° C. The resulting base is purified by forming the dihydrochloride thereof in acetone. After recrystallization from methanol, 3 g. of the dihydrochloride are obtained. M.P. 222° C. with decomposition.

Using the same procedure as in this example, 1-piperonyl 4-(methylsulfonylethyl) piperazine was produced. The base melts at 127° C. Yield 82% from methylsulfonylchlorethane.

The compounds of the invention possess interesting therapeutic properties including vaso-dilator, anti-tussive, spasmolytic, anti-convulsive and anti-ulcer activity.

A pharmacological investigation of the novel compounds shows low toxicity and remarkable anti-tussive activity. The acute toxicity of 1-(3',4'-ethylene-dioxy benzyl) 4-(3'',4''-methylene-dioxy benzoyl) piperazine hydrochloride was determined by intraperitoneal and oral administration to female white mice, NMRI strain, and was computed by the method of Lichtfeld and Wilcoxon. LD 50 was found to be 298.1 mg./kg. (from 328.8 to 270.3 mg./kg.) intraperitoneally, and 1.224 mg./kg. (1,631 to 919.4 mg./kg.) orally.

The anti-tussive activity was investigated in relation to experimentally-induced cough in animals. When given at a rate of 10 mg./kg. intraperitoneally to a conventionally anesthetized guinea-pig, the drug inhibits to an extent of 59.2% the cough induced by mechanical stimulation of the tracheal mucous membrane. 49% inhibition is obtained when drug is given orally at the same rate.

In the anesthetized cat, the drug given at doses of 2 to 3 mg./kg., inhibits coughing induced by electric stimulation of the laryngal nerve to an extent of 50 to 100% for a period of 10 to 30 minutes.

The effects of the compound on respiratory rhythm and amplitude was tested in the non-anesthetized rabbit. It was shown that given in a 5 mg./kg. dose, the compound increases the respiratory rhythm while slightly reducing the amplitude of respiratory movements.

The compound also shows a relaxing action on the trachea and partially opposes histaminic bronchospasm.

When applied in doses considerably higher than the anti-tussive doses, the compound was found to exhibit no inhibitive action on the gastro-intestinal tract in the rat, when tested by the "carbon meal" method.

In view of the above pharmacodynamic properties the novel compounds may be used in human therapy at doses in the order of from 10 to 100 mg. as cough sedatives in broncho-plumonar disorders. When given three times a day in the form of tablets, granules or syrups, in appropriate pharmaceutic carriers, at doses of 20 mg, 1-(3', 4'-dioxy benzyl ethylene) 4-piperonyl piperazine hydrochloride has been found extremely effective in quieting cough and soothing dyspnea in patients suffering from bronchitis, tracheitis, lung tuberculosis, and the like.

The compounds of the invention have also a benefic action in the cases of arteritis, coronaritis, Raynaud disease, asthma, epilepsy, ecclampsy, ulcers, hepatic colic, nephritic colic and the like.

The treatment may be safely continued over long periods of time, and no intolerance or other objectionable side effects were noted.

What we claim is:

1. A compound of the formula:

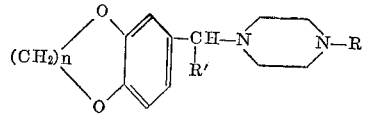

wherein: R is a member selected from the group consisting of benzyl; benzoyl; benzoyl substituted with from one to three substituents selected from the group consisting of hydroxyl, carbethoxyoxy, nitro, amino, alkoxy up to $C_4$ and alkylenedioxy up to $C_3$; benzyl substituted with from one to three substituents selected from the group consisting of hydroxyl, carbethoxyoxy, nitro, amino, lower alkoxy up to $C_4$ and alkylenedioxy up to $C_3$; benzhydryl substituted on one of the phenyl moieties by a member selected from the group consisting of halogen, lower alkoxy up to $C_4$ and methylenedioxy; phenacyl substituted on the phenyl moiety by a member selected from the group consisting of halogen, lower alkoxy up to $C_4$ and methylenedioxy; primary alkanol containing from 2 to 9 carbons; secondary alkanol containing from 2 to 9 carbons; primary and secondary alkanediol containing from 2 to 9 carbons substituted with a member selected from the group consisting of hydroxyalkoxyalkane, alkylthioalkane, alkylsulfonylalkane and containing from 2 to 8 carbons; and R' represents a member selected from the group consisting of hydrogen and alkyl containing up to 4 carbons and $n$ is an integer from 1 to 2.

2. The compound 1-piperonyl piperazine.
3. The compound 1-piperonyl 4-(3',4',5'-trimethoxy benzoyl) piperazine.
4. The compound 1-piperonyl 4-(3',4'-methylene dioxy benzoyl) piperazine.
5. The compound 1-piperonyl 4-(2'-hydroxy benzoyl) piperazine.
6. The compound 1-piperonyl 4-(3',5'-dimethoxy 4'-carbethoxyoxy benzoyl) piperazine.
7. The compound 1-piperonyl 4-(4'-carbethoxyoxy benzoyl) piperazine.
8. The compound 1-piperonyl 4-(2'-hydroxy 5'-carbethoxyoxy benzoyl) piperazine.
9. The compound 1-piperonyl 4-(4'-nitro benzoyl) piperazine.
10. The compound 1-(3',4'-methylene-dioxy benzoyl) 4-(3'',4''-ethylene-dioxy benzyl) piperazine.
11. The compound 1-(3',4'-ethylene-dioxy benzyl) piperazine.
12. The compound 1-(3',4'-ethylene-dioxy benzoyl) 4-(3'',4''-ethylene-dioxy benzyl) piperazine.
13. The compound 1-(α-methyl 3',4'-methylene-dioxy benzyl) 4-(3'',4''-methylene-dioxy benzoyl) piperazine.
14. The compound 1-(α-methyl 3',4'-methylene-dioxy benzyl) piperazine.
15. The compound 1-piperonyl 4-(3',4'-dimethoxy 4'-hydroxy benzoyl) piperazine.
16. The compound 1-piperonyl 4-(4'-hydroxy benzoyl) piperazine.
17. The compound 1-piperonyl 4-(4'-amino benzoyl) piperazine.
18. The compound 1,4-bi-piperonyl piperazine.
19. The compound 1-piperonyl 4-benzhydryl piperazine.
20. The compound 1-piperonyl 4-(4'-chloro benzhydryl) piperazine.
21. The compound 1-piperonyl 4-(3',4'-methylene-dioxy benzhydryl) piperazine.
22. The compound 1-piperonyl 4-phenacyl piperazine.
23. The compound 1-piperonyl 4-(4'-fluoro phenacyl) piperazine.
24. The compound 1-piperonyl 4-(3',4'-methylene-dioxy phenacyl) piperazine.
25. The compound 1-piperonyl 4-(2',3'-dihydroxy propyl) piperazine.
26. The compound 1-piperonyl 4-hydroxyethoxyethyl piperazine.
27. The compound 1-piperonyl 4-(methylthioethyl) piperazine.
28. The compound 1-piperonyl 4-(methylsulfonylethyl) piperazine.

References Cited in the file of this patent
UNITED STATES PATENTS

| | | |
|---|---|---|
| 2,056,046 | Fourneau | Sept. 29, 1936 |
| 2,251,287 | Lott | Aug. 5, 1941 |
| 2,362,128 | Gertler et al. | Nov. 7, 1944 |
| 2,653,153 | de Benneville | Sept. 22, 1953 |
| 2,688,026 | Krimmel | Aug. 31, 1954 |
| 2,887,484 | Funke | May 19, 1959 |

UNITED STATES PATENT OFFICE
CERTIFICATE OF CORRECTION

Patent No. 3,119,826                            January 28, 1964

Gilbert Regnier et al.

It is hereby certified that error appears in the above numbered patent requiring correction and that the said Letters Patent should read as corrected below.

Column 2, line 15, for "(1) Piperonyl", in italics, read -- 1-Piperonyl --, in italics; above line 34 insert -- EXAMPLE 2 --, as a centered heading; same column 2, line 59, strike out "methylene", first occurrence; column 3, line 5, for "-meth-", in italics, read -- -eth- --, in italics; line 9, for "(3,4-dioxy methylene)" read -- (3,4-methylene-dioxy) --; lines 62 and 63, for "(3,4-ethylene-dioxyl benzoyl chloride) benzoyl" read -- (3,4-ethylene-dioxy) benzoyl chloride --; line 64, for "3,4-dioxy ethylene" read -- 3,4-ethylene-dioxy --; same column 3, line 74, for "1-(3″,4″-dioxy α-methyl benzyl) piperazine" read -- 1-(α-methyl 3′,4′-methylene-dioxy benzyl) piperazine --; column 4, line 3, for "1-piperonyl" read -- 1-(3,4-methylene-dioxy phenyl) --; line 4, for "piperonyl" read -- 1-(3,4-methylene-dioxy phenyl) --; column 6, line 6, for "101-199° C." read -- 191-199° C. --; line 24, for "Lichtfeld" read -- Litchfield --; line 37, for "laryngal" read -- laryngeal --; same column 6, line 56, for "4′-dioxy benzyl ethylene 4-piperonyl piperazine" read -- 4′-ethylene-dioxy benzyl) 4-(3″,4″-methylene-dioxy benzoyl) piperazine --.

Signed and sealed this 9th day of March 1965.

(SEAL)
Attest:

ERNEST W. SWIDER                          EDWARD J. BRENNER
Attesting Officer                       Commissioner of Patents